(12) United States Patent
Riza

(10) Patent No.: US 6,885,807 B2
(45) Date of Patent: Apr. 26, 2005

(54) HIGH SPEED FIBER-OPTIC ATTENUATION MODULES

(75) Inventor: Nabeel Agha Riza, Oviedo, FL (US)

(73) Assignee: Nuonics, Inc., Winter Park, FL (US)

( * ) Notice: Subject to any disclaimer, the term of this patent is extended or adjusted under 35 U.S.C. 154(b) by 179 days.

(21) Appl. No.: 10/094,255

(22) Filed: Mar. 14, 2002

(65) Prior Publication Data

US 2002/0136524 A1 Sep. 26, 2002

Related U.S. Application Data

(60) Provisional application No. 60/275,792, filed on Mar. 14, 2001.

(51) Int. Cl.$^7$ .............................. G02B 6/00; G02B 6/42; G02B 6/26

(52) U.S. Cl. .............................. 385/140; 385/18; 385/7; 385/10

(58) Field of Search ................................ 385/8, 16, 18, 385/7, 10, 140, 20–22, 37, 31, 33, 36

(56) References Cited

U.S. PATENT DOCUMENTS

| | | | |
|---|---|---|---|
| 4,906,064 A | | 3/1990 | Cheung ..................... 385/16 X |
| 6,089,076 A | | 7/2000 | Mueller et al. ............ 73/24.06 |
| 6,154,307 A | * | 11/2000 | Veronesi et al. ............ 359/305 |
| 6,195,476 B1 | | 2/2001 | Schmid ......................... 385/7 |
| 6,282,336 B1 | | 8/2001 | Riza ............................. 385/21 |
| 2002/0045104 A1 | * | 4/2002 | Efimov et al. .................. 430/2 |

OTHER PUBLICATIONS

Riza, Nabeel A., Submicrosecond Speed Variable Optical Attenuator Using Acoustooptics, IEE Photonics Technology Letters, vol. 13, No. 7, Jul. 2001, pp. 693–695.

Mughal, M.J. and Riza, Nabeel A., Compact Acoustooptic High–Speed Variable Attenuator For High–Power Applications, IEEE Photonics Technology Letters, 2002.

(Continued)

Primary Examiner—Akm Enayet Ullah
Assistant Examiner—Kevin S. Wood
(74) Attorney, Agent, or Firm—James H. Beusse; Beusse Brownlee Wolter Mora & Maire, P.A.

(57) ABSTRACT

Unique multi-diffraction structures using electronically controlled Bragg diffraction devices such as acousto-optic (AO) devices to accomplish optical beam attenuation control functions. These variable optical attenuator (VOA) modules can be fully inertialess as they can use electronically programmable sub-microsecond speed AO devices to implement optical gain controls. These VOAs deliver desirable capabilities in one optically reversible unit, making high dynamic range, low loss, high power handling, ultra-fast, high optical isolation, broadband operation, self-aligning robust modules. These VOAs can be made essentially independent of the optical polarization of the incident light by the use of a unique fixed waveplate compensation technique within the VOA configuration that suppresses polarization dependent loss. Broadband gain control operation over several wavelengths can be achieved by controlling the frequency and electrical drive power of the chosen frequencies feeding the acousto-optic devices. Interleaver devices can be cascaded with the acousto-optic modules to improve wavelength selectivity of the overall VOA modules. Alternative embodiments can use electrically programmable Bragg gratings in polymer dispersed liquid crystal and acousto-optic tunable filter devices as Bragg grating devices. Embodiments are proposed using independently controlled Bragg diffractions using multiple drive signals connected to multiple device transducers. Drive signal formats can be digital, analog, or a combination for simultaneously driving the VOA modules. Dual-mode VOA module designs are also described using mirror positioning.

18 Claims, 7 Drawing Sheets

OTHER PUBLICATIONS

Dupas, A, Lavigne, B., Lautenschlaeger, W., Schabel, S., 10 Gbit/s RZ asynchronous packet mode receiver with high input power dynamic for future optical packet switching systems,, Sponsored by Optical Society of America/IEEE /Lasers and Electro–Optics Society, held in Monterey, California Jun. 13–15, 2001.

Mughal, M.J. and Riza, Nabeel A., 65 D b dynamic Range 2.8 Microseconds Switching Speed Variable Fiber–Optic Attenuator, $27^{th}$ European Conference on Optical Communication, Sep. 30–Oct. 4, 2001, RAI Congress Centre, Amsterdam, The Netherlands.

* cited by examiner

TOP VIEW:

SIDE VIEW:

(b)

HIGH SPEED FIBER-OPTIC ATTENUATION MODULES

SPECIFIC DATA RELATED TO THE INVENTION

This application claims the benefit of U.S. patent application Ser. No. 60/275,792, filed on Mar. 14. 2001.

FIELD OF INVENTION

This invention relates to optical and fiber-optic (FO) variable optical attenuators (VOA) using electronically controlled Bragg-mode based light beam deflectors such as acousto-optic deflectors. The VOA structure can have several optical designs, all implementing the unique theme of multiple Bragg diffractions for optical gain or loss control of the incident optical beam. These basic no moving parts FO attenuator structures can be used for controlling the power in multiple light signals in optical networks such as wavelength division multiplexed (WDM) optical communications, distributed sensor networks, and photonic signal processing systems requiring gain control. The high speed, high isolation attenuators based on AO devices have the additional capability of handling high optical powers and can be used in optical gain control modules used in free-space laser communications, high power laser instrumentation, and high power laser machining and turbulence flow systems.

BACKGROUND OF THE INVENTION

Variable fiber-optic attenuators (VOA) are the basic building blocks for several key optical systems. Presently, these attenuators are required as equalizers in wavelength division multiplexed (WDM) optical communication systems using non-uniform gain optical amplifiers. Other important applications include polarization dependent loss compensation in fiber optic networks, optical component testing, and optical receiver protection. Hence, a variable fiber-optic attenuator with fast sub-microseconds duration speed with exceptionally high attenuation dynamic range (e.g., 50 dB) control is a present challenge to the optical community.

So far, different types of attenuators have been realized but all lack the microsecond speed and high (50 dB or more) dynamic range in a compact high laser damage threshold package. Sliding block mechanical attenuators have excellent optical characteristics but they adjust very slowly, e.g., one-half to one second. Waveguide thermo-optic attenuators have better response time (e.g., in milliseconds) but they do not offer the ultra-high dynamic range as in T. V. Clapp, S. Day, S. Ojha and R. G. Peall, "Broadband variable optical attenuator in silica waveguide technology," ECOC '98, pp. 301–302, September 1998; and S. -S. Lee, Y.-S. Jin, Y.-S. Son, and T.-K. Yoo, "Polymeric tunable optical attenuator with an optical monitoring tap for WDM transmission network," IEEE Photon. Technol. Lett. 11, pp. 590–592, 1999. Liquid crystal-based attenuators also suffer from the slow speeds much like thermo-optics. Micromirror-based reflective optical attenuators offer good dynamic range and better response time as in C. R. Giles, V. Aksyuk, B. Barber, R. Ruel, L. Stulz, and D. Bishop, "A silicon MEMS optical switch attenuator and its use in lightwave subsystems," IEEE J Select. Top. Quant.Elect. 5, pp. 18–25, 1999, but they do not match the exceedingly fast switching time offered by acousto-optics.

Over the years, attempts have been made to realize AO FO VOAs as AO technology has speeds in the sub-microseconds regime. These include an in-line fiber attenuator in K. Jedrzejewski, M. Franczyk, and A. Leszczynski, "Acousto-optically tuned single-mode in-line fiber attenuator," Proc. SPIE 3731, pp. 103–106, 1999, where the maximum tuning range achieved was limited to 13 dB. In addition, both bulk and fiber-based AO tunable filters (or AOTFs) have been used for optical gain controls, particularly for simultaneous multiple wavelengths. AO based attenuators are also available from commercial vendors today such as Intraction Corp., Bellwood, Ill. and Brimrose Corp., Baltimore, Md. Prior art references where AO devices have been used as wavelength selective switches and optical power level controllers are listed as: K. W. Cheung, M. M. Choy, and H. Kobrinski, "Electronic Wavelength Tuning Using Acoustooptic Tunable Filter with Broad Continuous Tuning Range and Narrow Channel Spacing," IEEE Photonics Technology Letters, Vol. 1, pp.38–40, No. 2, February 1989; D. A. Smith, J. E. Baran, J. J. Johnson, and K. W. Cheung, "Integrated-optic acoustically tunable filters for WDM networks," IEEE J. Select. Areas Commun., Vol. 8, pp. 1151–1159, 1990; J. L. Jackel, J. E. Baran, G. -K Chang, M. Z. Iqbal, G. H. Song, W. J. Tomlinson, D. Fritz, and R. Ade, "Multichannel Operation of AOTF Switches: Reducing Channel-to-Channel Interaction," IEEE Photonics Technology Letters, Vol. 7, pp. 370–372, No. 4, April 1995; F. Tian and H. Herrmann, "Interchannel Interference in Multiwavelength Operation of Integrated Acousto-Optical Filters and Switches," Journal of Lightwave Technology, Vol. 13, pp. 1146–1154, No. 6, June 1995; D. A. Smith, et.al., "Evolution of the acousto-optic wavelength routing switch," IEEE/OSA Journal of Lightwave Tech, Vol.14, No.6, June 1996; N. A. Riza, "Wavelength Switched Fiber-Optically Controlled Ultrasonic Intracavity Probes," IEEE LEOS Ann. Mtg. Digest, pp.31–36, Boston, 1996; N. A. Riza, "Photonically Controlled Ultrasonic Arrays: Scenarios And Systems," IEEE International Ultrasonics Symp. Digest, pp.1545–1550, San Antonio, 1996; N. A. Riza, "Acousto-Optic Device-based High Speed High Isolation Photonic Switching Fabric for Signal Processing," Optics Letters, Vol.22, Jul. 1, 1997; D. Ostling and H. E. Engan, "Narrowband acousto-optic tunable filtering in a two-mode fiber," Optics Letters, Vol.20, pp. 1247–1249, 1995; H. S. Kim, S. H. Yun, I. K. Kwang, and B. Y. Kim, "All-fiber acousto-optic tunable filter notch filter with electronically controlable spectral profile," Optics Letters, Vol.22, pp. 1476–1478, 1997; T. A. Birsk, P. St. J. Russell, and C. N. Pannell, "Low power acousto-optic device based on a tapered single-mode fiber," IEEE Photonics Technology Letters, Vol. 6, pp. 725–727, 1994; S. G. Farwell, M. N. Zervas, and R. L Laming, "2×2 fused fiber null couplers with asymmetric wasit cross sections for polarization independent (<0.01 dB) switching," Journal of Lightwave Technology, Vol. 16, pp. 1671–1679, 1998; S. H. Huang, X. Y. Zou, S.-M. Hwang, A. E. Wilner, Z. Bao, and D. A. Smith, "Experimental demonstration of dynamic network equalization of three 2.5 Gb/s WDM channels over 100 km using acousto-optic tunable filters," IEEE Photonics Technology Letters, Vol. 8, pp. 1243–1245, 1996; H. S. Kim, S. H. Yun, H. K. Kim, N. Park, and B. Y. Kim, "Actively gain-flattened erbium-dopped fiber amplifier over 35 nm by using all fiber acousto-optic tunable filters," IEEE Photonics Technology Letters, Vol. 10, pp. 790–792, 1998; J.-X. Cai, K.-M. Feng, X. Chen, A. E. Willner, D. A. Smith, C.-H. Lee, and Y.-J. Chen, "Experimental demonstration of dynamic high-speed equalization of three WDM channels using acousto-optic modulators and a wavelength demultiplexer," IEEE Photonics Technology Letters, Vol. 9, pp. 678–680, 1997; T. Nakazawa, M. Doi, S. Taniguchi, Y. Takasu, and M. Seino, "Ti:LiNbO3 AOTF for 0.8 nm channel-spaced WDM," in *Post-Deadline papers OFC'98*, 1998, PDI; N. A Riza and J. Chen, "Ultrahigh 47-dBoptical drop rejection multiwavelength adddropfilter using spatial filteringand dual bulk acousto-optic tunable filters," *Optics Letters*, Vol.23, pp. 945–947, 1998; E. R Mueller, R. A. Hart, W. A. Veronasi, and F. T. Olender, "System o control the power of a beam," U.S. Pat. No. 6,089,076, Jul. 18, 2000; S. Scmid and P. C. Sistemi, "Acoustooptic devices having an acoustic attenuator structure," U.S. Pat. No. 6,195,476, Feb. 27, 2001; F. Tian and H. Hermann, "Interchannel interference in multiwavelength operation of integrated acousto-optical filters and switches," *Journal of Lightwave Technology*, Vol. 13, pp. 1146–1154, 1998; T. E. Dirnmick, G. Kakarantzas, T. A. Birsk, A. Diez,a and P. St. J. Russell, "Compact all-fiber acousto-optic tunable filters with bandwidth-length product," *IEEE Photonics Technology Letters*, Vol. 12, pp. 1210–1212, 2000; K. W. Cheung, "Acousto-optic tunable filters in narrowband WDM networks: System issues and network applications," *IEEE Journal of Selected Areas in Communication*, Vol. SAC-8, pp. 1015–1024, 1990; K.-W. Chueng, "Switch for selectively switching optical wavelengths," U.S. Pat. No. 4,906,064, March 1990; H. Hermann, A. Modlich, Th. Muller, and W. Sohler, "Double-stage, integrated, acousto-optical add drop multiplexers with improved crosstalk performance," *Proc. ECOC'97* (Edinburgh 1997), Vol. 3, pp. 10–13, 1997; D. A. Smith, R. S. Chakravarthy, Z. Bao, J. E. Baran, J. L. Jackel, A. d'Alessandro, D. J. Fritz, S. H. Huang, X. Y. Zou, S.-M. Hwang, A. E. Willner, and K. D. Li, "Evolution of the acousto-optic wavelength routing switch," *Journal of Lightwave Technology*, Vol. 14, pp. 1005–1018, 1996; H. Hermann, K. Scaffer, andSh. Schmidt, "Low-loss tunable integrated acousto-optical wavelength filter in $LiNbO_3$ with strong sidelobe supression," *IEEE Photonics Technology Letters*, Vol. 10, pp. 120–122, 1997; H. Hermann, A. Modlich, Th. Muller, W. Sohler, and F. Wehrmann, "Advanced integrated, acousto-optical switches, add-drop multiplexers and WDM cross-connects in $LiNbO_3$," *Proc. ECIO'97* (Stockholm 1997), April 1997; J. Sharony, K.-W. Chueng, and T. E. Stern, "The wavelength dilation concept in lightwave networks-Implementation and system considerations," *Journal of Lightwave Technology*, Vol. 11, pp. 900–907, 1993; G. H. Song, "Asymmetric dilation of multiwavelength cross-connect switches for low-crosstalk WDM optical networks," *Journal of Lightwave Technology*, Vol. 15, pp. 430–436, 1997. A major problem with past AO device-based attenuators is two fold. First, when these prior art VOAs employ the DC or undiffracted beam from the AO device as the output beam of the VOA, the dynamic range is severely limited to say 10 dB. This is because AO devices work on the principle of Bragg volume diffraction and even a high 90% diffraction with typically a watt of radio frequency (RF) AO device drive power leads to a 10% through light, implying a near 10:1 power reduction or 10 dB attenuation value for the VOA. To solve this DC as output beam problem, the diffracted first order beam can be used as the VOA output beam. In this case, the VOA dynamic range is greatly enhanced because a zero RF drive signal to the AO device leads to essentially no light at the VOA output port/Once an RF is applied to the AO device, the input light gets diffracted and deflected to the output port resulting in lower VOA attenuation. The key limitation of this way to increase VOA dynamic range is that the diffracted beam in an AO device always undergoes a Doppler frequency shift equal to the RF, implying that this VOA has a permanent frequency shift on the input optical carrier. This doppler problem can negatively impact WDM systems, where wavelengths are being tightly allocated and maintained.

Recently N. A. Riza in U.S. Pat. No. 6,282,336 for "High Speed Fiber-Optic Switch," issued Aug. 28, 2001 and in N. A. Riza and Z. Yaqoob, "High-speed programmable optical attenuator," Proceedings of SPIE, Vol. 4046, paper 10, Orlando, Fla., Apr. 26, 2000 and N. A. Riza and Z. Yaqoob, "Sub-microsecond speed variable optical attenuator using acousto-optics," IEEE Photonic Technology Letters, Vol.13, pp.693–695, July 2001., proposed a new technique to simultaneously solve both the doppler and dynamic range problem of the AO-based VOA. The technique proposed employed the concept of double diffraction and frequency driven output beam misalignment. FIG. 1. shows an embodiment of this concept where the two AO devices are arranged to generate opposing Doppler shifts on the diffracted beams leading to a VOA with both high dynamic range and no wavelength shifts on the input beam.

The purpose of this invention as partly described earlier in N. A. Riza, R Akbar, S. Sumriddetchkajorn, F. Perez, and M. J. Mughal, "47 dB dynamic range sub-microsecond switching speed variable fiber-optic attenuator for fast transient fiber-optic," OSA Topical Meeting on Photonics Switching, Postdeadline Paper PDP2, June 15, Monterey, Calif., 2001, and M. J. Mughal and N. A. Riza, "65 dB dynamic range 2.8 microseconds switching speed variable fiber-optic attenuator," $27^{th}$ European Conference on Optical Communications (ECOC) Proceedings, Vol.6, Postdeadline Papers, PD.A.1.6, Oct. 4, Amsterdam, Netherlands, 2001, and M. J. Mughal and N. A. Riza, "Compact acousto-optic high speed variable attenuator for high power applications," IEEE Photonic Technology Letters, April 2002, is to show how the double diffraction concept used in the prior patent application cited in the earlier paragraph can be extended to multi-diffraction (i.e., two or more diffractions) structures to realize more efficient and compact Bragg diffraction-based VOA modules.

BRIEF DESCRIPTION OF THE DRAWINGS

For a better understanding of the present invention, reference may be had to the following detailed description taken in conjunction with the accompanying drawings in which.

SUMMARY DESCRIPTION OF THE INVENTION

Figure 1:
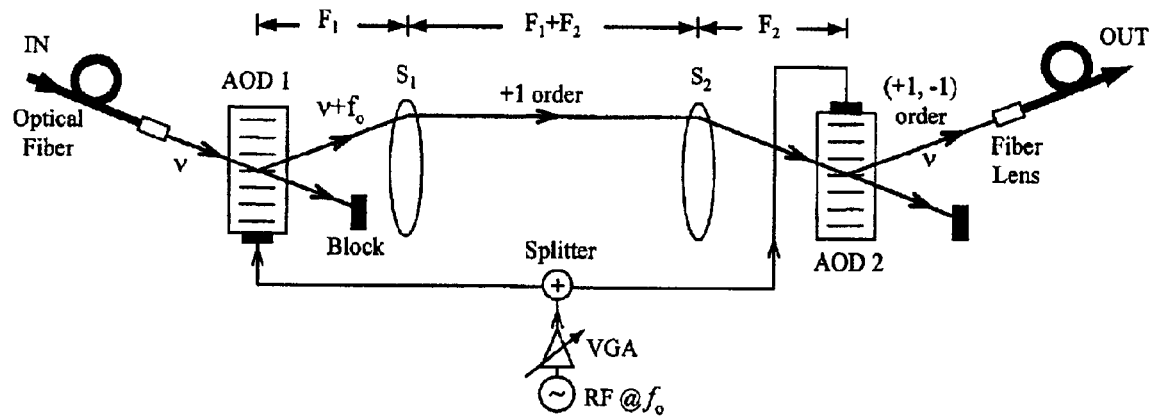
FIG. 1. shows a double diffraction-based doppler free high dynamic range VOA.

Unique multi-diffraction structures using electronically controlled Bragg diffraction devices such as acousto-optic (AO) devices are proposed to accomplish optical beam attenuation control functions. These variable optical attenuator (VOA) modules can be fully inertialess as they can use electronically programmable sub-microsecond speed AO devices to implement optical gain controls. These VOAs deliver desirable capabilities in one optically reversible unit, making high dynamic range, low loss, high power handling, ultra-fast, high optical isolation, broadband operation, self-aligning robust modules. These VOAs can be made essentially independent of the optical polarization of the incident light by the use a unique fixed waveplate compensation technique within the VOA configuration that suppresses polarization dependent loss. Broadband gain control operation over several wavelengths can be achieved by controlling the frequency and electrical drive power of the chosen frequencies feeding the acousto-optic devices. Interleaver devices can be cascaded with the acousto-optic modules to improve wavelength selectivity of the overall VOA modules. Alternative embodiments can use electrically programmable Bragg gratings in polymer dispersed liquid crystal and acousto-optic tunable filter devices as Bragg grating devices. Embodiments are proposed using independently controlled Bragg diffractions using multiple drive signals connected to multiple device transducers. Drive signal formats can be digital, analog, or a combination for simultaneously driving the VOA modules. Applications for the proposed VOAs include aerospace photonic signal processing systems, wavelength division multiplexed (WDM) fiber-optic communications, and optical sensor networks.

DETAILED DESCRIPTION OF THE INVENTION

Optical attenuation via an AO device is controlled by varying the electrical drive power to the AO device that varies the AO device diffraction efficiency $\eta$. If two AO devices are used in cascade to form a doppler-free high dynamic range FO VOA as first proposed in N. A. Riza, "High speed fiber-optic switch," U.S. Pat. No. 6,282,336, issued Aug. 28, 2001, and later in N. A. Riza and Z. Yaqoob, "High speed programmable optical attenuator," SPIE Conf. Proc. Vol. 4046, Paper 10, April 26, Orlando, 2000, then essentially light undergoes a double diffraction effect leading to a $\eta^2$ light efficiency control at the output of the module. This is the case when both AO devices are fed simultaneously by the same RF power and drive frequency. In dB or Decibel units, the squaring operation in diffraction efficiency leads to a multiply by two in dB, as dBs are a logarithmic to the base 10 scale. This refers to the doubling of the dynamic range and forms the basis for the present application where this concept is further extended to more that two diffractions if needed in the VOA structure. In effect, with M diffractions a $\eta^M$ light efficiency control at the output of the module is generated leading to an M times improvement in dynamic range in dB compared to a single diffraction-based VOA module.

The originally proposed "Double Diffraction" configuration module design is shown in FIG. 1. As an example design, the +1 order beam coming out of the $1^{st}$ AO device or Bragg cell enters the $2^{nd}$ Bragg cell where it exits as a double diffraction +1,−1 order beam that has undergone a Doppler shift cancellation. By controlling the RF amplifier gain, the VOA dynamic range is controlled.

A preferred embodiment of the AO-based VOA shown in FIG. 1 that improves on compactness and polarization dependent loss of the VOA uses a half-wave plate (HWP) to reduce polarization dependent loss variation by invoking a 90 degree flip in the light polarization state between the first Bragg diffraction and the second Bragg diffraction. Because Bragg diffraction is polarization sensitive, i.e., diffraction efficiency is different for the two orthogonal linear polarization states, where one linear polarization is along the acoustic wave travel direction, a double diffraction process with a 90 degree polarization state flip for the incident light for the second diffraction essentially equalizes diffraction efficiencies for the two linear states of polarization thus reducing polarization dependent loss. This is a critical and unique feature in all the proposed Bragg diffraction based VOAs in this application, and the method can be applied to other Bragg diffraction-based fiber-optic modules.

Figure 2:
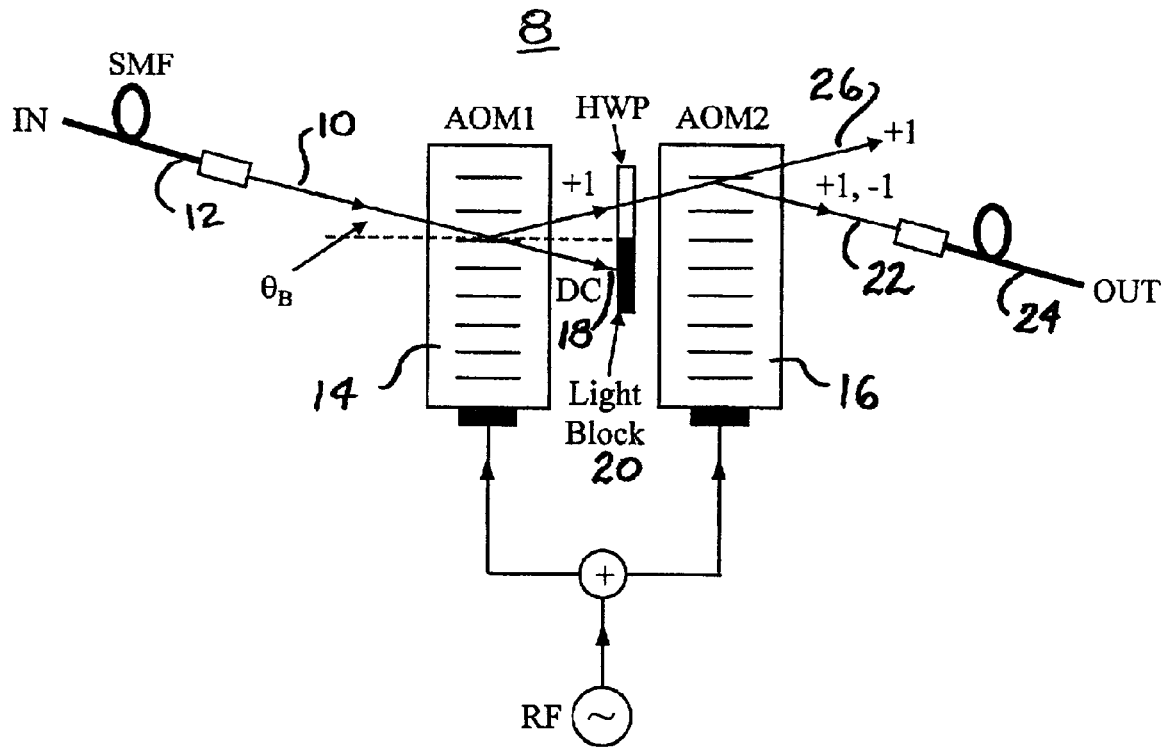
FIG. 2 shows a lens free compact version of the two AO device-based VOA shown in FIG. 1.

The basic design of FIG. 1 uses imaging lenses and two AO devices and the following nomenclature: . v: Optical Frequency; $f_o$: RF frequency, Si: Spherical Lens; $F_i$: Focal Length of $i^{th}$ Lens; AOD: Acousto-Optic Device; VGA: Variable Gain Amplifier As shown in FIG. 2, VOA 8 receives a collimated optical beam 10 emerging from the input fiber collimator 12 incident on a first AO device 14 such as a AO modulator also called AOM. This light is incident on the first AOM at the Bragg angle, thus inducing the first order optical beam (i.e., positive Doppler shifted beam). A second AOM 16 has an acoustic wave propagation direction aligned parallel to the AOM 14 acoustic wave direction, so that the first order optical beam emanating from the first AOM hits the second AOM at the Bragg angle. The zeroth order or DC beam 18 is blocked by the light block 20. Hence, the incident first positive Doppler shift beam suffers the negative Doppler shift in the second AOM, thereby canceling the overall Doppler shift frequency in this beam 22 (see +1,−1 optical beam shown in FIG. 2). This +1,−1 optical beam 22 is suitable for use as the output optical beam at 24 in the AO-based VOA to obtain a high attenuation dynamic range.

With a zero RF drive power, there is only the zeroth order optical beam 26 in the AO-based VOA and this optical beam is not coupled into the output fiber collimator 24, indicating a maximum optical attenuation. By varying the RF drive power, the +1,−1 optical beam is generated and the desired optical attenuation can be obtained at the receiving fiber-optic collimator. The static insertion loss of this AO-based VFOA is limited by the maximum diffraction efficiency of the AOMs 14, 16 used in the structure. This also implies that for a minimum attenuation setting, a maximum RF drive power is required for both AOMs. A further higher dynamic range can be obtained by cascading M more AOMs in the structure, where M is an even number. Furthermore, the two AOMs 14, 16 can be arranged so that a change in AOM drive frequency from a predesigned set frequency to another frequency physically moves the doubly diffracted beam with respect to the fiber output lens entrance, causing optical beam attenuation via miscoupling.

The VOA in FIG. 2 also has a lower polarization dependent loss when compared to the FIG. 1 design, as the FIG. 2 design uses a unique placement of a Half-wave plate to generate polarization effects compensation.

Figure 3:
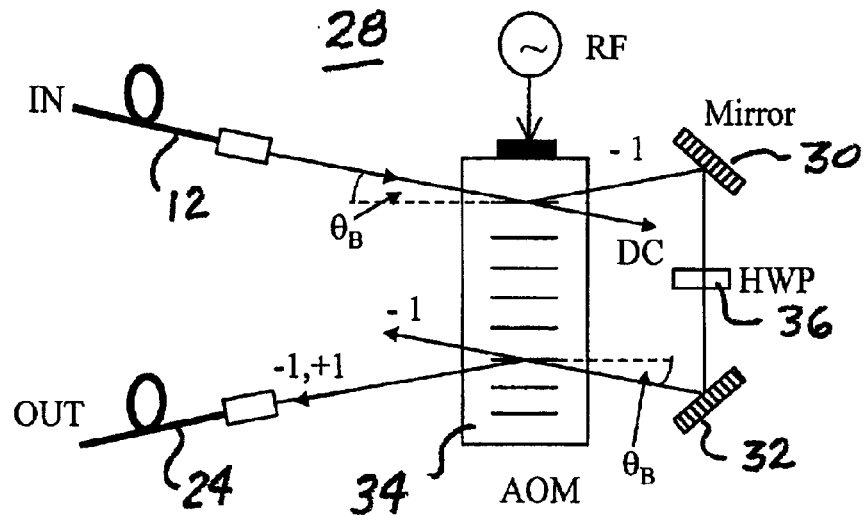
FIG. 3 shows a modification of the VOA in FIG. 2 using a single AO device-based VOA.

FIG. 3 shows a further improvement on the design in FIG. 2, where here a single AO device-based VOA 28 is proposed forming a more compact design of the VOA in FIG. 2. Here, two mirrors 30, 32 are used to return the light for a second diffraction from the same AO device 34. The output beam has a zero relative Doppler shift as the beams are arranged to give opposing Doppler shifts. Half-wave plate (HWP) 36 compensates for polarization effects.

Figure 4:
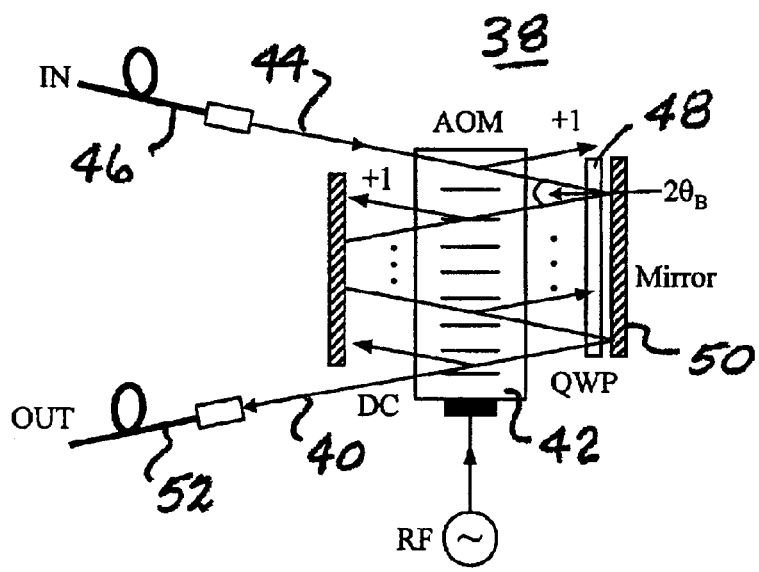
FIG. 4 shows an AO-based VOA where more than two diffractions are used via a single AO device and the zero order of DC beam is chosen as the final output beam.

FIG. 4 shows an AO-based VOA 38 where the optical beam propagation is in a triangular pattern and the DC or zero order beam 40 is used as the final output beam. The advantage of using the DC beam is that when no attenuation is required from the VOA, no RF drive power is applied to the AO device 42 making this VOA technique a power efficient design. The collimated optical beam 44 emerging from the input fiber collimator 46 is incident on the AOM 42 at the Bragg angle, thus inducing the first order optical beam (i.e., positive Doppler shifted beam). Both the zeroth and the first order optical beams pass through a quarter waveplate (QWP) 48 and hit the mirror 50 located behind the AOM. The mirror 50 is aligned parallel to the AOM 42 so that only the zeroth order optical beam is retro-reflected to the AOM at the Bragg angle, thus generating another positive Doppler shifted optical beam. After the zeroth order optical beam bounces back and forth between mirrors N times (i.e., N diffractions), it is coupled into the output fiber collimator 52 located on the same side as the input fiber collimator, indicating that N is an even number. This operation also implies that this AO-based VOA 38 offers a higher dynamic range compared to the previous two diffraction VOAs 8 and 28. In addition, a higher optical attenuation is obtained at a higher RF drive power and the electrical power consumption is zero at the minimum optical attenuation level. The QWP 48 is used to compensate for the polarization dependent loss (PDL) induced by the AOM 42 compared to the transmissive design in FIG. 2, the design in FIG. 4 is reflective and hence a QWP is used instead of a HWP.

Figure 5:
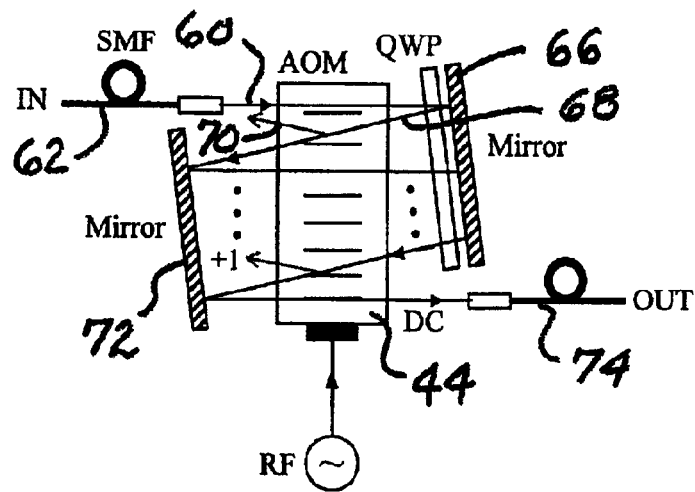
FIG. 5 shows another AO-based VOA where more than two diffractions are used via a single AO device and the zero order of DC beam is chosen as the final output beam.

An alternate embodiment of the FIG. 4 multi diffraction VOA design is shown in the VOA 58 of FIG. 5 that uses optical beam propagation in a sawtooth configuration. In this case, the collimated optical beam 60 emerging from the input fiber collimator 62 is normally incident on the AOM 64. The mirror 66 located behind the AOM 64 is adjusted in such a way that the reflected optical beam 68 is incident on the AOM at the Bragg angle in order to generate the first diffracted order beam 70. Now, the zeroth order optical beam 68 passes through the AOM and hits another mirror 72. This mirror 72 is aligned parallel to the first mirror so that the reflected zeroth optical beam 68 hits the AOM 64 at 0 degree incident angle. The output fiber collimator 74 can be placed either on the same side or opposite side to the input fiber collimator 62. Again, the output zeroth order beam of the VOA 58 is coupled to the output fiber collimator 74.

Figure 6:
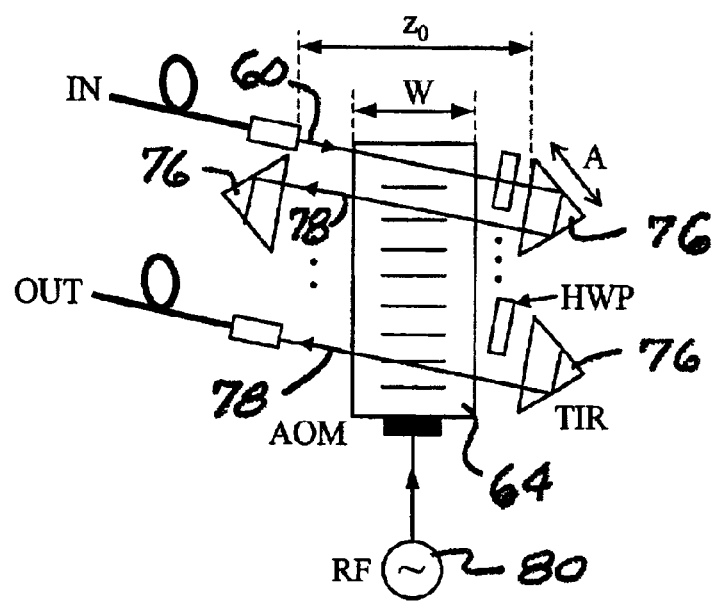
FIG. 6 shows an alternate embodiment of the multi-diffraction zero order VOA where total internal reflection (TIR) prisms are used for redirecting the beam for optimized Bragg diffraction.

Instead of using a mirror pair shown in FIGS. 3–5, total internal reflection (TIR) prisms can be used for beam routing in an AO-based VOA structures. Such an example design is shown in FIG. 6, where the TIR prisms 76 make the retro-reflected optical beams 78 parallel to the incident optical beam 60 putting a certain physical spacing between the beams depending on the size of the prisms 76. Similar to the triangular configuration shown in FIG. 4, the first order optical beam is generated every time the optical beam passes through the AOM 64. The half waveplates (HWPs) 78 are placed in front of the TIR prisms 76 in order to compensate for the polarization dependent loss (PDL). Note that an even number of HWPs and TIR prisms should be chosen for PDL compensation and therefore the output fiber collimator has to be located on the same side as the input fiber collimator. In each embodiment, the RF generator 80 may be the same and provides a voltage and frequency controlled signal to excite the Bragg devices in a known manner.

WDM communications is demanding ever tighter spacings between individual adjacent wavelengths in a sequence of linearly increasing wavelengths such as $\lambda 1, \lambda 2, \lambda 3, \lambda 4, \lambda 5, \lambda 6, \lambda 7, \lambda 8, \lambda 9, \lambda 10, \lambda 11$, and so on. One device that physically separates odd and even numbered wavelengths is generally called an Interleaver such as labelled I1 in FIG. 7a. The interleaver is an optically reversible device with three ports. Light containing all the wavelengths flows into one port and exits the device via two output ports where one output port has the odd wavelengths and the other output port has the even wavelength. Hence, the inter-wavelength separation at the output ports is twice the inter-wavelength separation at the input port Let the smallest inter-wavelength separation be defined as $\delta\lambda = \lambda_{n+1} - \lambda_n$, for n=1,2,3, The FIG. 7a architecture consists of a three port optical circulator device 82 connected to three interleavers 84a, 84b, 84c, all labeled I1 and four optical gain equalization modules 86a–86d, all labeled E. Multi-wavelength light containing all the closely spaced wavelengths, i.e., $\lambda 1, \lambda 2, \lambda 3 \lambda 4, \lambda 5, \lambda 6, \lambda 7, \lambda 8, \lambda 9, \lambda 10, \lambda 11$, and so on enters via the IN port 88 of the circulator 82 and passes through to the IN port 90 of the first interleaver 84a. At this first wavelength separation stage, the adjacent channel wavelength separation is given by $\Delta B_1 = \delta\lambda$. After the first interleaver 84a, the second wavelength separation stage with two separate fiber paths has an adjacent channel wavelength separation given by $\Delta B_2 = 2\delta\lambda$. The output fibers 92, 94 of the first interleaver 84 are connected to the two separate input ports 96, 98 of two other interleavers 84b, 84c. After this second stage of interleavers, the third wavelength separation stage is formed with an adjacent channel wavelength separation given by $\Delta B_3 = 4\delta\lambda$. The four output fibers 100, 102, 104, 106 of this third stage are connected to the four separate equalization multiwavelength operation VOA modules 86a–86d. An exemplary VOA module 86 based on a bulk AOTF device 108 is shown in FIG. 7b. Note that by using the interleavers, the wavelength selectivity of the "E" modules has been relaxed by a factor of four using two interleaver stages. Further interleaver stages can also be added to further separate the wavelengths per output fiber. Thus, the architecture in FIG. 7a when used with low wavelength selectivity equalizer modules can still lead to a high wavelength selectivity optical power equalization sub-system. This innovation is particularly useful with AO device-based equalizers that tend to have limited wavelength selectivity.

Figure 7A:
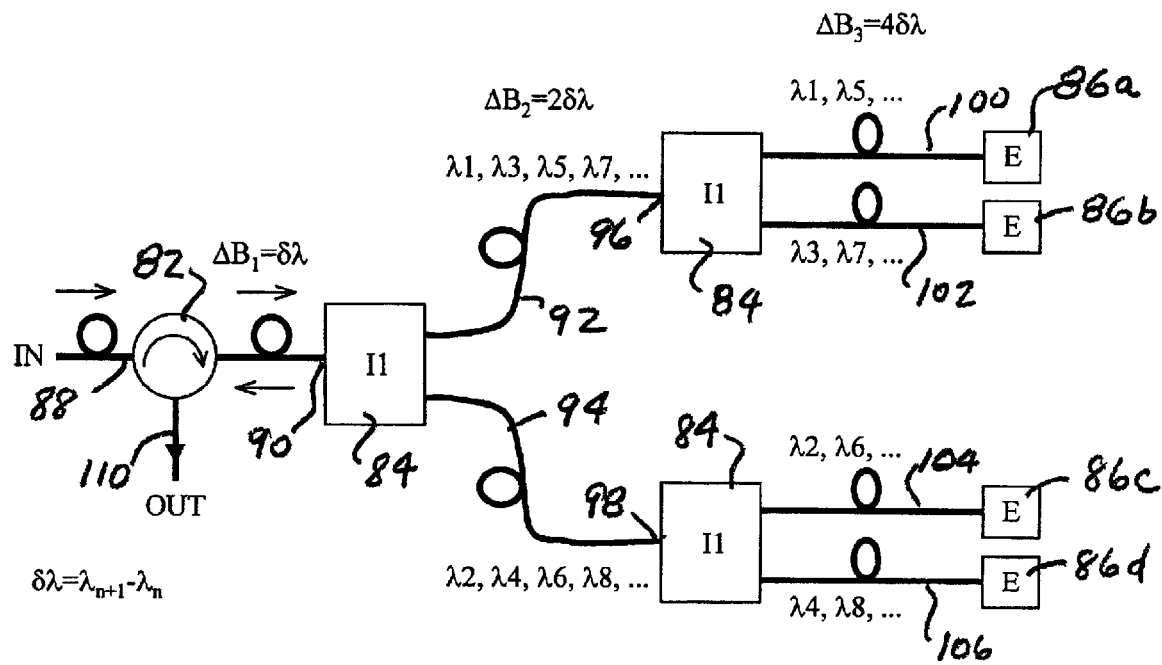
FIG. 7a shows a wavelength separation relaxed multi-wavelength optical gain controller architecture using interleavers and retroreflective gain control modules labelled "I" and "E", respectively.
Figure 7B:
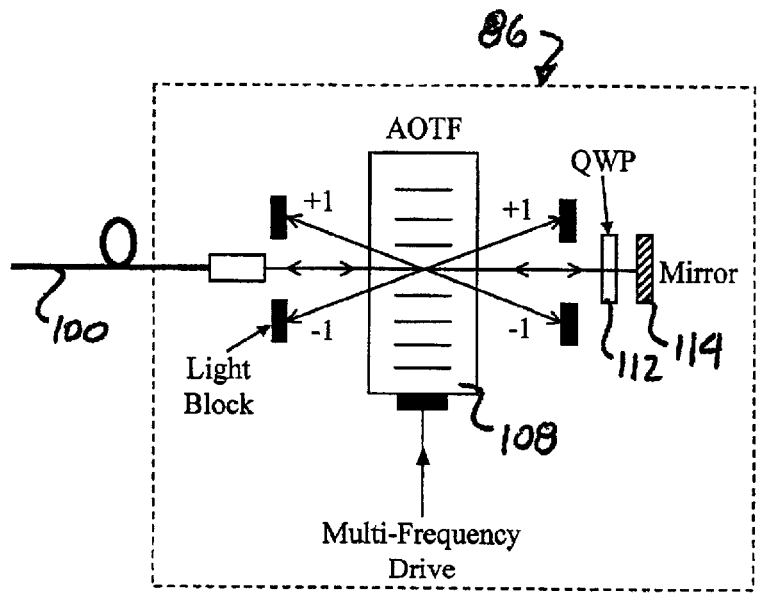
FIG. 7b shows an embodiment of the "E" module of FIG. 7a using a single acousto-optic tunable filter (AOTF).

The subsystem in FIG. 7a is a retroreflective design where light after power weighting in the VOA modules 86 travels back though the same paths and devices to recombine and exit via the circulator output port 110. The QWP 112 (FIG. 7b) is used for reducing PDL in the VOA module 86. Note that other VOA modules can be used for the architecture in FIG. 7a such as the gain control modules described in FIGS. 2–6. In particular, the gain control modules can be turned retroreflective as needed in FIG. 7a architecture by using a mirror 114 at the output port as shown in FIG. 7b.

Figure 8A:
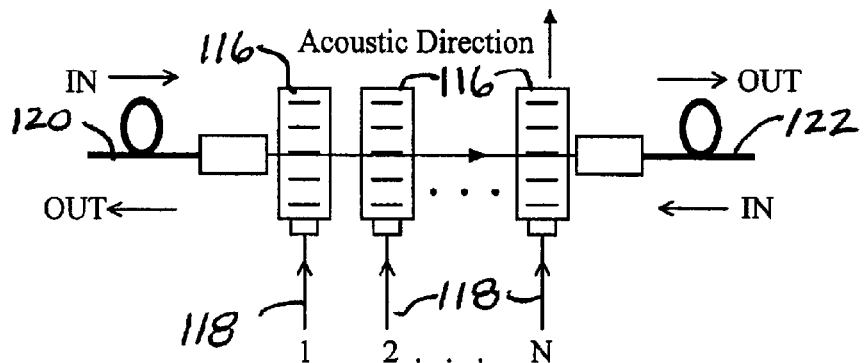
FIG. 8a shows a multi-Bragg diffraction attenuator concept using N independent Bragg diffraction efficiency control signals, with the Bragg diffraction devices arranged in a cascaded serial control architecture sandwiched between two fiber-fiber lens ports.
Figure 8B:
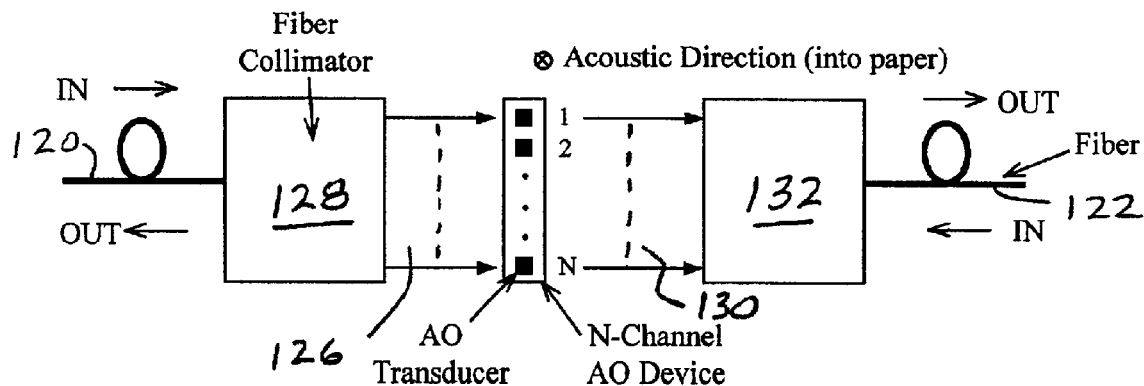
FIG. 8b shows an alternative embodiment of FIG. 8a where a N-channel AO device is illuminated in parallel by the whole collimated beam coming from the input fiber port.

The embodiments in FIGS. 1–7 have used at most two independent electrical drive signals for realizing the Bragg diffraction device-based gain control modules. An alternate embodiment may use modules with N (where N>2) independent Bragg diffraction control signals such as shown in FIGS. 8a and 8b where AO devices 116 are used as the Bragg diffractors. In FIG. 8a, N independent AO devices 116, each with its independent RF drive signal 118 are cascaded serially between two fiber-fiber lens pairs 120, 122 to produce a multi-diffraction attenuator structure. There are various drive scenarios for this module where for instance an N-bit digital attenuator can be programmed by operating the N AO devices 116 in a binary on/off mode. The drive level of each of these binary drive signals can be adjusted to produced the desired diffraction efficiency for each device to generate a desired attenuation curve. On the other hand, all N RF drive signals can be operated in an analog mode where drive levels each time are reset to get the desired attenuation level. Finally, the AO drive signals can operate in a mixed mode where some signals are digital and some are analog.

FIG. 8b shows an alternative embodiment where a N-channel AO device 124 is illuminated in parallel by the whole collimated beam 126 coming from the input fiber port via collimator 128. In this case, each AO device drive channel controls a certain spatial area of the input beam, allowing controlled overall beam attenuation. Again, the N drive signals can have varied formats. The output beam 130 is combined in collimator 132 and directed to output fiber 122.

Figure 8C:
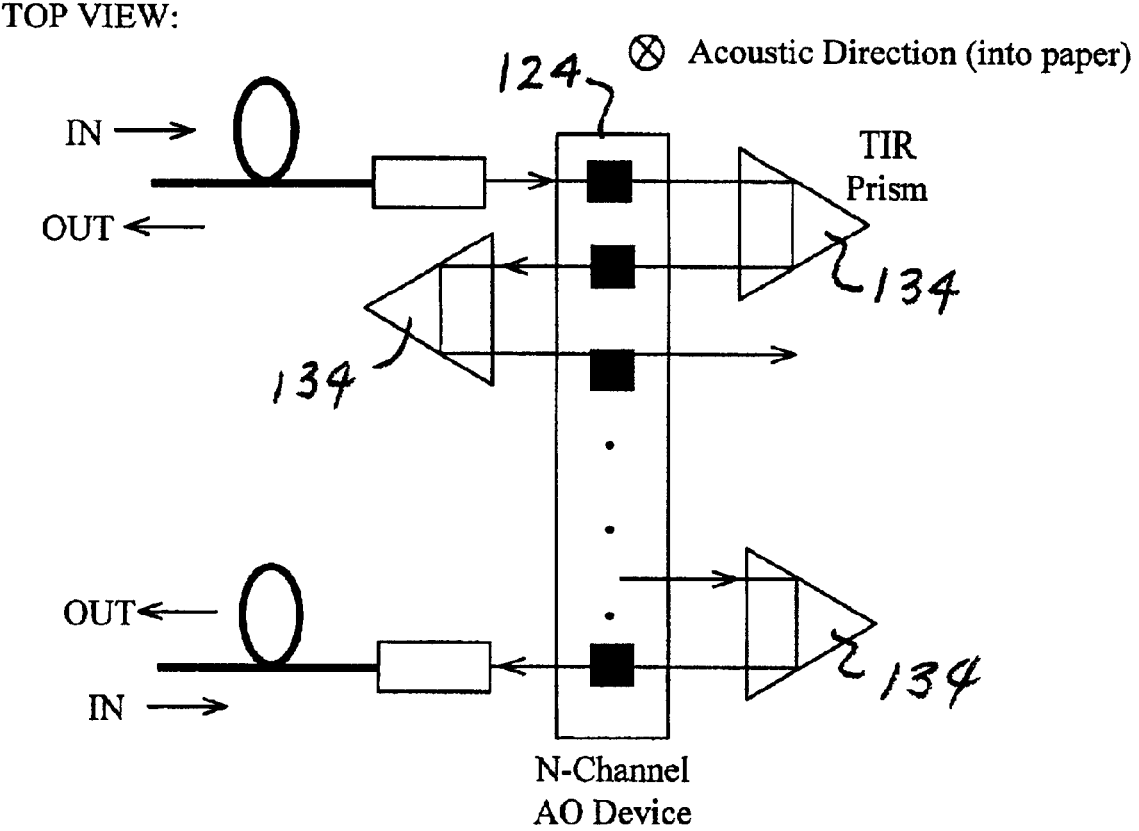
FIG. 8c shows an alternative embodiment of the FIG. 8a attenuator where a TIR prism based folding design with N channels of a single crystal AO device is used to form the attenuator.

FIG. 8c shows an alternative embodiment of FIG. 8a using the AO device 124 of FIG. 8b where total internal reflection (TIR) prisms 134 form a folding design with N channels of the single crystal AO device being used to form the attenuator. Physically separate N AO devices can also be used in this design.

Figure 9A:
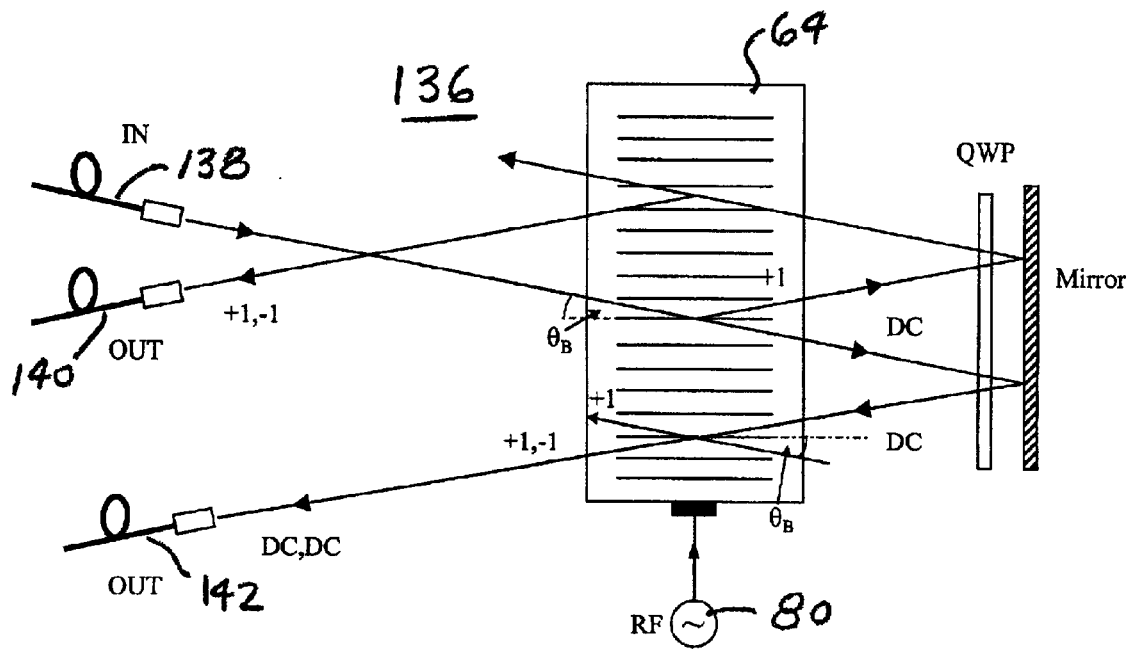
FIG. 9a shows dual-mode multi-diffraction VOA with one input port and two separate output ports where a two in one VOA module is formed that can provide high dynamic range moderate loss (using +1 times −1 order diffractions) and moderate dynamic range low loss (using double diffraction on the DC beam) VOA operational features using the same AO device.
Figure 9B:
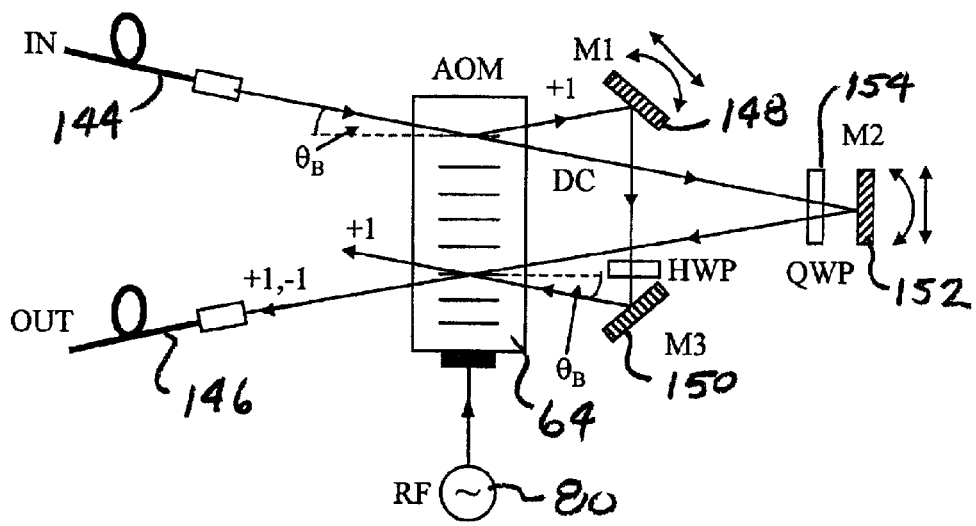
FIG. 9b shows a modification of FIG. 9a having dual-mode module design with one input port and one output port where mode selection is done by aligning the correct mirrors and misaligning the required mirrors.

FIG. 9a shows a dual-mode multi-diffraction VOA 136 with one input port 138 and two separate output ports 140, 142 where a two in one VOA module using AO device 64 is formed that can provide high dynamic range, moderate loss (using +1 times −1 order diffractions) and moderate dynamic range low loss (using double diffraction on the DC beam) VOA operational features using the same AO device. VOA 136 uses two separate output ports, one port 140 for the high dynamic range +1, −1 order mode and another port 142 for the moderate dynamic range DC,DC diffraction mode. This module 136 can simultaneously provide two modes in VOA operations and also functions like a 1×2 variable tap coupler. FIG. 9b shows a modification of FIG. 9a having dual-mode module with one input port 144 and one output port 146 where mode selection is done by aligning the correct mirrors and misaligning the required mirrors. In this module, one mode of operation exists at one time, but can be changed to the other mode by mechanical mirror motion to prevent the required Bragg diffraction. Note that for all input/output ports, various collimated beam options can be used including fiber lenses or non-fiber options such as freespace. Alignment of mirror pair 148, 150 is used for high dynamic range with mirror 152 misaligned. Misaligning one of the mirrors 148, 150 while aligning mirror 152 produces moderate dynamic range. Note use of a QWP 154 for moderate range use and use of HWP 156 for high range.

The proposed attenuator structures can also be formed by other analog diffraction-based technologies such as bulk and integrated electro-optics, magneto-optic, and microelectromechanical systems (MEMS)-based devices. These include electro-optic ceramics, electro-optic liquid crystals, MEMS-type electrostatic or magnetically actuated micromirror design gratings, and surface acoustic-wave (SAW) devices.

An additional feature of the VOAs is that it has robust automated active beam alignment capabilities via analog frequency tuning capability of the AO device drive signals that allows for precision beam motion. Small beam or FO-collimator misalignments that affect the optical insertion loss of the switch can be corrected by adjusting the RF frequency driving the AO devices. Small changes in the RF frequency can result in accurate beam motion of the optical beams in the switch structure to optimize coupling efficiency and add robustness to the design.

What is claimed is:

1. An optical attenuator comprising:
   first means for diffracting a light beam to produce a first diffracted beam portion and a first non-diffracted beam portion;
   second means for diffracting one of said first diffracted beam portion and said first non-diffracted beam portion to produce an attenuated light beam;
   said first means and said second means comprising a single acousto-optical device; and
   including beam directing means for redirecting at least one of said first diffracted beam portion and said first non-diffracted beam portion into said acousto-optical device.

2. The optical attenuator of claim 1 wherein said first means and said second means comprise a pair of spaced acousto-optical devices.

3. The optical attenuator of claim 1 wherein said beam directing means comprises a mirror.

4. The optical attenuator of claim 1 wherein said beam directing means comprises a prism.

5. The optical attenuator of claim 2 and including beam steering means positioned intermediate said pair of acousto-optical devices.

6. The optical attenuator of claim 5 wherein said beam steering means comprises a convex lens.

7. The optical attenuator of claim 5 wherein the beam steering means comprises a pair of spaced convex lenses.

8. The optical attenuator of claim 1 and including beam redirecting means positioned on each side of said acousto-optical device for repeatedly redirecting one of said diffracted and non-diffracted beams through said acousto-optical device.

9. The optical attenuator of claim 1 wherein said diffracting means comprises a voltage and frequency responsive Bragg acousto-optical device.

10. The optical attenuator of claim 2 and including a half-wave plate positioned between said pair of acousto-optical devices.

11. The optical attenuator of claim 1 and including beam redirecting means positioned for directing said diffracted beam portion through a half-wave plate prior to redirecting said diffracted beam portion through said acousto-optical device.

12. The optical attenuator of claim 8 wherein said beam redirecting means comprises a mirror.

13. The optical attenuator of claim 8 wherein said beam redirecting means comprises a plurality of TIR prisms.

14. The optical attenuator of claim 12 and including a quarter-wave plate aligned on one side of said acousto-optical device for intercepting each beam impinging on and reflected from said mirror.

15. An optical attenuator comprising:
- a plurality of independent Bragg diffraction devices arranged in a cascaded serial control architecture between an input light beam port and an output light beam port;
- beam directing means for directing an input light beam from said input port through each of said diffraction devices in sequence to said output port; and
- electronic control means for controlling each of said Bragg diffraction devices for controlling diffraction frequencies to effect attenuation of said input light beam without causing Doppler shifts.

16. A dual-mode optical attenuator comprising:
- a Bragg diffraction device positioned for receiving a light beam from an input light beam port at a selected Bragg angle;
- a beam reflecting means positioned adjacent said Bragg device and arranged to reflect the light beam from said input port back through said Bragg device;
- a quarter-wave plate positioned between said Bragg device and said beam reflecting means;
- first and second output ports for receiving beams reflected from said beam reflecting means and passing through said Bragg device at least a second time, one of said output ports receiving a twice diffracted beam portion and another of said output ports receiving a non-diffracted beam portion.

17. An optical frequency sensitive attenuator comprising:
- a plurality of Bragg diffraction devices each excited to pass a particular optical wavelength signal at a known diffraction angle;
- beam reflection means at each of the diffraction devices for reflecting the particular optical wavelength signal in a reverse path through each associated diffraction device; and
- means directing each reflected signal to a selected output port.

18. The optical frequency sensitive attenuator of claim 17 wherein said known diffraction angle is zero and said beam reflection means comprise a mirror and quarter-wave plate.

* * * * *